Aug. 27, 1974   W. BREY ET AL   3,832,261

MATERIALS HANDLING ASSEMBLY

Original Filed Feb. 11, 1970   3 Sheets-Sheet 1

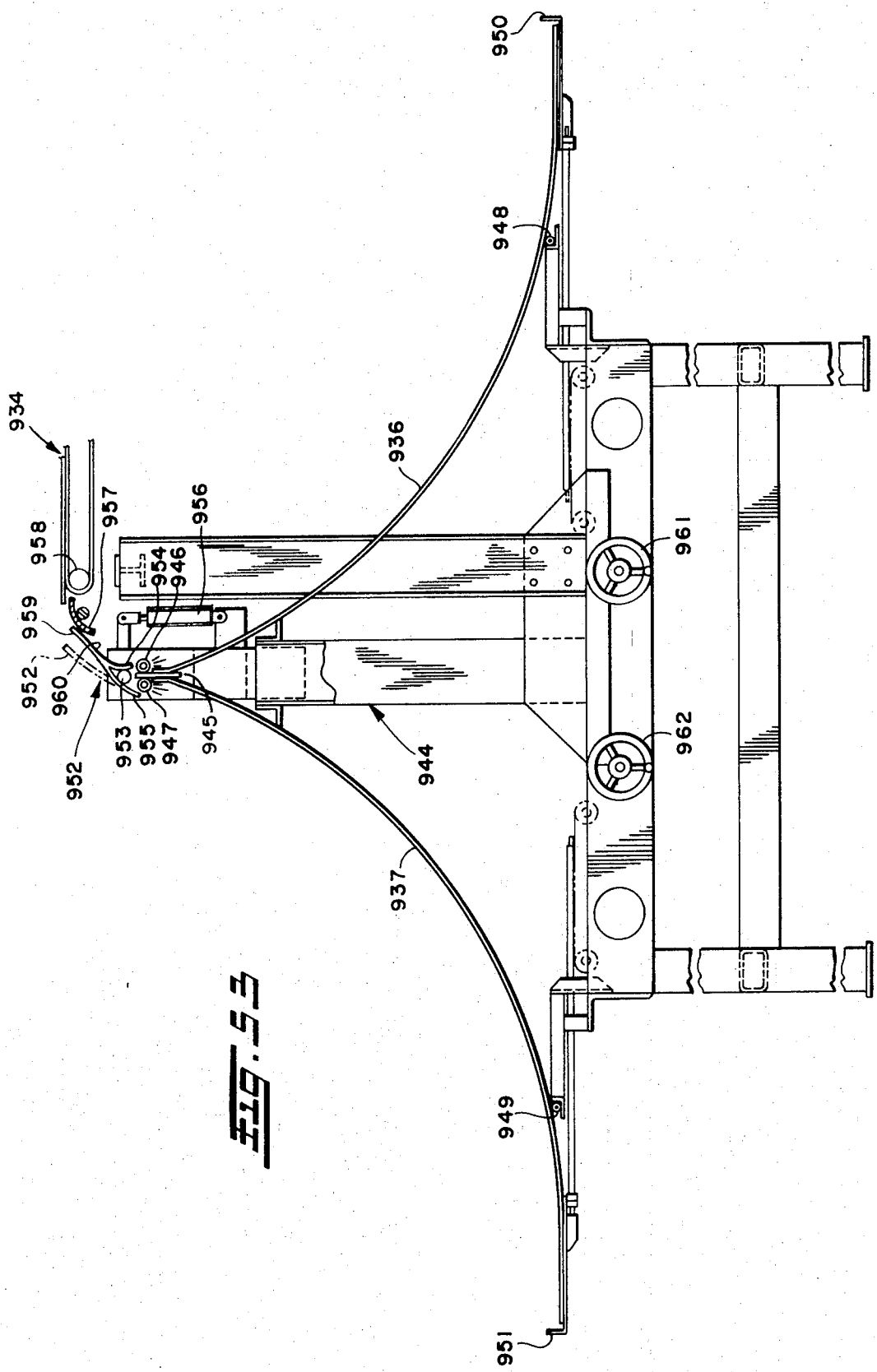

United States Patent Office 3,832,261
Patented Aug. 27, 1974

3,832,261
MATERIALS HANDLING ASSEMBLY
Wilhelm Brey, Cuyahoga Falls, Ohio, William Hostetler, Santa Ana, Calif., and Earl Ferdnand Loeffler, Akron, Hubert Ernest Kolm, Louisville, and Fred Grove Elder, Atwater, Ohio, assignors to The Firestone Tire & Rubber Company, Akron, Ohio
Original application Feb. 11, 1970, Ser. No. 10,579, now U.S. Patent No. 3,700,526. Divided and this application Sept. 15, 1971, Ser. No. 180,833
Int. Cl. B29h *17/28;* B60c *9/14*
U.S. Cl. 156—405  2 Claims

ABSTRACT OF THE DISCLOSURE

A fully automatic machine for producing "green tires" or unvulcanized tire carcasses, especially suitable for making tubeless tires. The machine comprises a plurality of interconnected and dependent assemblies or stations where specialized operations, normally done semi-automatically or by hand, are carried out by mechanical devices acting in sequence. The machine includes a plurality of conventional tire building drums continuously moving between horizontally disposed, stationary table assemblies where innerliner and chafer strips, and first and second ply material are successively wrapped on the drums as they move across the table on which the material is positioned. The wrapped drums from these assemblies, are sent to turret units where they are arcuately positioned for receiving beads, tread cushion, stitching, strips of whitewall, if required, and are discharged from the collapsed drums for removal and storage. The stripped drums, or drums from which tires are removed, are automatically expanded and recycled through the assemblies for building more tire carcasses.

This is a division of application Ser. No. 10,579 filed Feb. 11, 1970, now U.S. Pat. 3,700,526, the disclosure of which is hereby incorporated herein by reference, and which may be consulted for relation between the several inventive concepts of the continuing divided inventions.

DESCRIPTION OF THE FIGURES OF THE DRAWING

The following description of the invention will be better understood by referring to the annexed drawing, wherein:

FIG. 53 is view of a pair of diverging chutes of the ply material handling unit;

MATERIAL HANDLING ASSEMBLY

Figure 3:
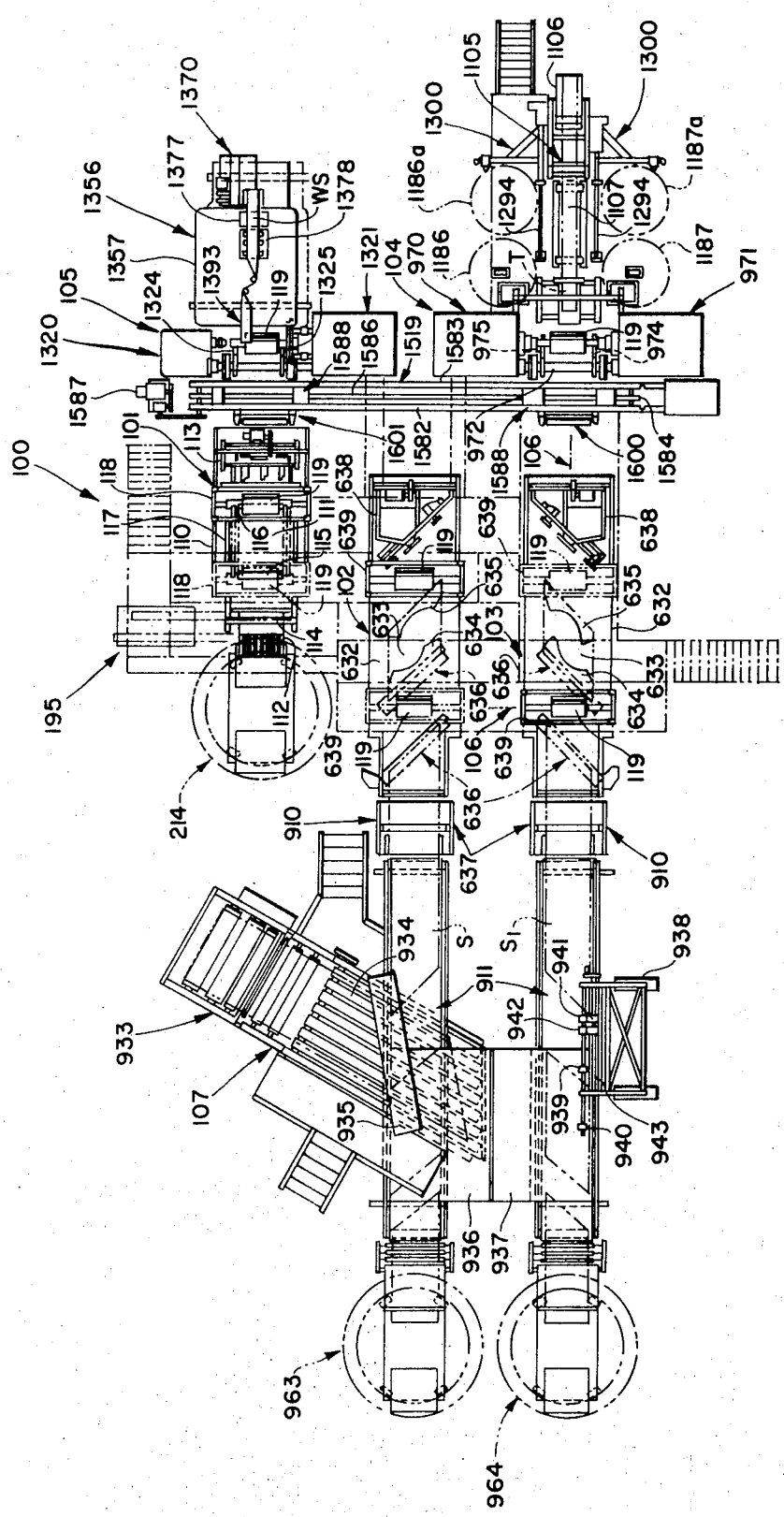
FIG. 3 is a plan view of the machine.
Figure 52:
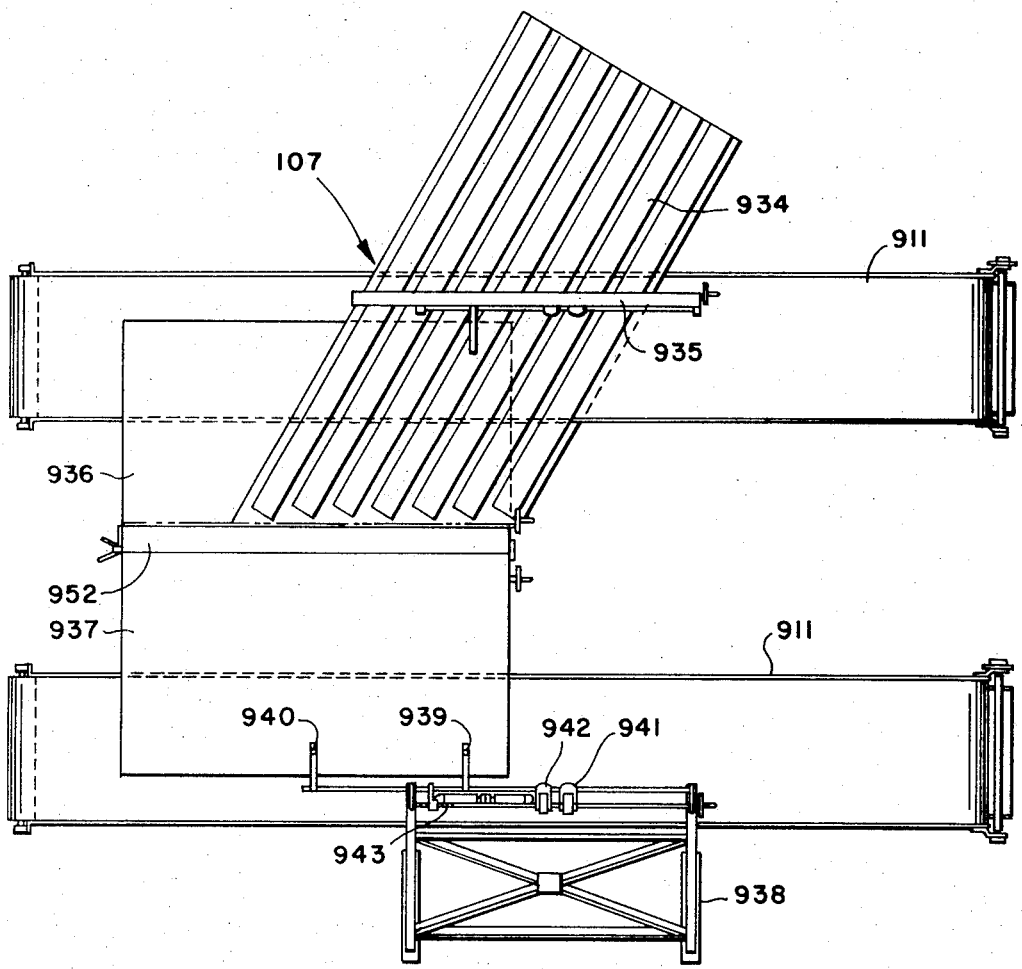
FIG. 52 is a plan view of a unit for handling ply material.

The MH unit 107 (FIGS. 3, 52–53) comprises a storage device 933 for holding at least two rolls of ply material in fabric wrapping to permit replacement of a depleted roll without disrupting operation of the unit. An overhead conveyor 934 is disposed in surmounted relation to the floor conveyors 911 for carrying ply material from the storage device 933. A cutter 935 is disposed above the overhead conveyor 934 for bias cutting predetermined lengths of ply material for deflection into a pair of oppositely disposed chutes 936 and 937, which diverge toward the parallel floor conveyors 911 leading to the 1-Ply unit 102 and 2-Ply unit 103.

A structural frame 938 is positioned adjacent each floor conveyor 911. A set of electric eyes 939 and 940 are disposed on the frame 938 for sensing ply material on the chutes 936 and 937. A pair of light projectors 941 and 942 are mounted on the frame 938 for transmitting a pair of parallel light lines on the floor conveyors 911. An operator at the floor conveyor 911, takes the ply material from the chutes 936 and 937 and splices them together on the conveyors 911 into continuous sheets of first and second ply material with properly oriented cords. It is important that none of the splices fall within the projected light lines, since it is predetermined that the ply material will be cut on the bias by the cutter assemblies 636 somewhere between these two lines. As previously indicated, the cutter tears rather than cuts the ply material on the bias. It is necessary that only one layer of ply material falls into position for cutting or tearing by the cutter assembly 636. If the splice falls within the light lines, the operator will recut the preceding piece by hand to reposition the splice from between the light lines. The light projectors 941 and 942 are adjustable along a drive screw 943 which is hand operated.

The diverging chutes 936 and 937 are mounted on a table frame 944. The chutes 936 and 937 are secured at their upper marginal edges, to a plate 945 which is coextensive with the width of the chutes 936 and 937. A couple of tubes 946 and 947 with air holes are secured to the plate 945 and are attached to an air pump for sending a stream of air down the surfaces of the chutes 936 and 937. A set of similar air tubes 948 and 949 are provided near the bottom edges 950 and 951 of the chutes 936 and 937 to strengthen the air stream, such that the ply material will slide down the chutes on a cushion of air.

A deflector or baffle 952 is secured to a rotatable pivot rod 953 spanning the chutes 936 and 937. The deflector 952 is provided with curved ends 954 and 955 extending on either side of the pivot rod 953. An air cylinder 956 is provided for rotating the deflector 952 into and out of engagement with a shield 957 mounted adjacent the head roller 958 of the overhead conveyor 934, in ply material receiving relation to the conveyor 934. When the deflector 952 engages the shield 957 as shown in heavy line, the ply material passes over the topside 959 of the deflector 952 and is deflected down the chute 937. When the deflector 952 is disengaged from the shield 957 as shown in the dotted position, the ply material engages the underside 960 of the deflector 952 and is deflected down the other chute 936. A pair of hand cranks 961 and 962 are used to adjust the lateral position of the bottom edges 950 and 951 of the chutes 936 and 937. The ply material, as it moves down the chutes 936 and 937, is in proper cord oriented relation for splicing to the continuous sheets of first and second ply material already formed on the conveyors 911. The action of the ply material as it is reversely directed down the chute 936 is tantamount to taking a piece of ply material from the chute 937 and flipping it over on its reverse side, which is literally what must be done to properly orient the two plies.

What is claimed is:
1. In combination,
   (a) a supply of rubberized cord plies,
   (b) first and second ply receiving conveyors,
   (c) first and second fixed chutes diverging from their upper margins between said supply and said conveyors,
   (d) pivot means between said supply and said chute-margins,
   (e) deflector means having first and second end portions straddling said pivot, and
   (f) means to selectively guide a ply over said first end portion and said first chute to said first conveyor, and over said second end portion and said second chute to said second conveyor.

2. The combination of claim 1, which includes:
(g) means for providing a stream of air adjacent the surfaces of the chutes on which the ply material slides.

References Cited

UNITED STATES PATENTS

| | | | |
|---|---|---|---|
| 3,428,510 | 2/1969 | Jones et al. | 156—406 |
| 2,936,813 | 5/1960 | Haase | 156—126 |
| 1,425,147 | 8/1922 | Subers et al. | 156—516 |
| 1,944,389 | 1/1934 | Abbott, Jr. | 156—128 |
| 2,962,083 | 11/1960 | Hasselquist | 156—405 |

FOREIGN PATENTS

| | | | |
|---|---|---|---|
| 556,603 | 4/1958 | Canada | 156—405 X |

CLIFTON B. COSBY, Primary Examiner

U.S. Cl. X.R.

156—123, 264, 266, 394, 516, 557, 568